US006270846B1

(12) United States Patent
Brinker et al.

(10) Patent No.: US 6,270,846 B1
(45) Date of Patent: Aug. 7, 2001

(54) METHOD FOR MAKING SURFACTANT-TEMPLATED, HIGH-POROSITY THIN FILMS

(75) Inventors: C. Jeffrey Brinker, Albuquerque, NM (US); Yunfeng Lu, San Jose, CA (US); Hongyou Fan, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/517,689

(22) Filed: Mar. 2, 2000

(51) Int. Cl.$^7$ ........................................... B05B 5/00
(52) U.S. Cl. ................. 427/385.5; 427/165; 427/168; 427/389.7; 427/240; 427/421; 427/430.1
(58) Field of Search ................................ 427/162, 164, 427/165, 168, 372.2, 240, 428, 430.1, 385.5, 389.7

(56) References Cited

U.S. PATENT DOCUMENTS

| | | | |
|---|---|---|---|
| 5,858,457 | 1/1999 | Brinker et al. | 427/162 |
| 5,922,299 | 7/1999 | Bruinsma et al. | 423/335 |
| 6,143,358 * | 11/2000 | Singh et al. | 427/162 |

OTHER PUBLICATIONS

Burkett, S., Sims, S., and Mann, S., "Synthesis of Hybrid Inorganic–organic Mesoporous Silica by Co–condensation of Siloxane and Organosiloxane Precursors," Chem. Commun., 1996, 11, 1367–1368. (No Month).

Fowler, C., Burkett, S., and Mann, S., "Synthesis and Characterization of Ordered Organo–silica–surfactant Mesophase with Functionalized MCM–41–type Architecture," Chem. Commun., 1997, 1769–1770. (No Month).

Lim, M., Blanford, C., and Stein, A., "Synthesis and Characterization of a Reactive Vinyl–functionalized MCM–41: Probing the Internal Pore Structure by a Bromination Reaction," J. Am. Chem. Soc., 1997, 119, 4090–4091. (No Month).

Feng, X., Fryxell, G., Wang, L., Kim, A. Liu, J., and Kemner, K., "Functionalized Monolayers on Ordered Mesoporous Supports," Science, 1997, 276, 923–926. (No Month).

Sellinger, A., Weiss, P., Nguyen, A., Lu, Y., Assink, R., Gong, W., and Brinker, C., "Continuous Self–assembly of Organic–inorganic Nanocomposite Coatings that Mimic Nacre," Nature, 1998, 394, 256–260. (No Month).

\* cited by examiner

*Primary Examiner*—Shrive P. Beck
*Assistant Examiner*—Jennifer Calcagni
(74) *Attorney, Agent, or Firm*—Elmer A. Klavetter

(57) ABSTRACT

An evaporation-induced self-assembly method to prepare a surfactant-templated thin film by mixing a silica sol, a surfactant, and a hydrophobic polymer and then evaporating a portion of the solvent during coating onto a substrate and then heating to form a liquid-phase, thin film material with a porosity greater than approximately 50 percent. The high porosity thin films can have dielectric constants less than 2 to be suitable for applications requiring low-dielectric constants. An interstitial compound can be added to the mixture, with the interstitial compound either covalently bonded to the pores or physically entrapped within the porous structure. The selection of the interstitial compound provides a means for developing thin films for applications including membranes, sensors, low dielectric constant films, photonic materials and optical hosts.

15 Claims, No Drawings

METHOD FOR MAKING SURFACTANT-TEMPLATED, HIGH-POROSITY THIN FILMS

This invention was made with Government support under Contract No. DE-DE-AC04-94AL85000 awarded by the Department of Energy. The Government has certain rights in the invention.

BACKGROUND OF THE INVENTION

The invention relates to a method for producing surfactant and microemulsion templated thin films and more particularly, to an evaporation-induced method for producing high-porosity, surfactant and microemulsion templated hybrid (inorganic/organic) and composite thin films.

Hybrid organic/inorganic films with controlled pore structure and surface chemistry are of interest for a range of applications including membranes, sensors, low dielectric constant (low k) films, photonic materials, and optical hosts. Films with controlled pore structure and high porosity (that is, greater than 50%) are particularly attractive to applications requiring materials with low dielectric constants (for example, dielectric constants less than 2). Surfactant templating is a rather recent approach toward achieving pore size control of inorganic frameworks, and so-called hybrid sol-gel chemistry provides a convenient route to derivatize the pore surfaces with covalently-bonded organic ligands. Burkett et al. (Burkett, S., Sims, S., and Mann, S., Chemical Communications, 1996, 11, 1367–1368), Fowler et al. (Fowler, C., Burkett, S., and Mann, S., Chemical Comm., 1997, 1769–1770), and Lim et al. (Lim, M., Blanford, C., and Stein, A., J. Amer. Chem. Soc., 1997, 119, 4090–4091) recently combined these approaches to form hybrid inorganic/organic mesoporous silica. Their synthesis procedures involved reacting tetraalkoxysilanes ($Si(OR)_4$, where R=ethyl or methyl) and an organoalkoxysilane ($R'Si(OR)_3$, where R' is a non-hydrolyzable organic ligand) with water under basic pH conditions in the presence of surfactant (cetyltrimethylammonium bromide) with initial surfactant concentration $c_o$ greater than the critical micelle concentration (cmc). These procedures result in the precipitation of powder. Various acid/solvent extraction procedures were used to remove the surfactant, resulting in organically-modified mesoporous powders with 1-dimensional, hexagonal architectures. The organic ligands in the mesoporous products included vinyl, phenyl, n-octyl, 3-sulfanylpropyl, aminopropyl, 2,3-epoxypropoxy, and imidazole. In these examples, the hybrid mesoporous silica was a powder, precluding its use in such promising applications as membranes, low k films, and optically-based sensors that generally require transparent, defect-free, supported thin films.

A second general approach to preparing hybrid-mesophases is to prepare a stable, mesoporous silica product and then to react the pore surfaces with various organic groups using standard silane coupling chemistry. For example, Feng et al. (Feng, X., Fryxell, G. Wang, L. Kim. A., Liu, J. and Kemner, K., Science, 1997, 276, 923–926) prepared mesoporous silica products using cetyltrimethylammonium chloride as the surfactant template. After calcination, the mesoporous silica was reacted with trimethoxymercaptopropylsilane. The powder was used to remove mercury and other heavy metals from contaminated solutions. Mesoporous silicas have also been organically-derivatized via vapor phase techniques. These powders suffer the same limitations as described above.

Sellinger et al. (Sellinger, A., Weiss, P., Nguyen, A., Lu, Y., Assink, R., Gong, W., and Brinker, C., Nature, 1998, 394, 256–260; incorporated herein by reference) describe a solvent evaporation technique to form ordered structures through a liquid phase process, but with little or no porosity. Brinker et al. (U.S. Pat. No. 5, 858,457, issued on Jan. 12, 1999) describe a solvent-evaporation method to form mesostructured films using metal oxides but the described process does not provide for the preparation of hybrid inorganic/organic and composite thin films. Brinker et al. also do not provide for covalently bonding ligands to the porous film structure or for entrapping molecules within the pores. Useful would be a liquid-phase method to form highly porous thin films using a solvent evaporation technique with essentially uni-modal pore size distributions and high surface areas.

SUMMARY OF THE INVENTION

According to the present invention, an evaporation-induced self-assembly method is used to prepare a high-porosity, surfactant and microemulsion templated thin film by mixing a precursor sol, a solvent, water, a surfactant, and a hydrophobic polymer. The polymer, such as polypropylene oxide or polypropylene glycol methylacrylate, is soluble in the sol. The surfactant, such as $HO(CH_2CH_2O)_{20}(CH_2CHCH_3O)_{70}(CH_2CH_2O)_{20}H$ and $H_3(CH_2)_{15}(OCH_2CH_2)_{10}OH$ is at an initial concentration less than the critical micelle concentration. Upon coating the mixture onto a substrate, evaporation of the solvent occurs to form a microemulsion and surfactant-templated thin film material. Subsequent heating yields a high-porosity surfactant and microemulsion-templated thin film with a porosity greater than approximately 50 percent. The thin film can have a dielectric constant less than 2.

DETAILED DESCRIPTION OF THE INVENTION

The present invention provides a method to prepare high-porosity, mesophase structures and subsequent thin films with controlled pore structure and surface chemistry where the porosity is greater than approximately 50%. A hybrid mesoporous thin film incorporates inorganic, organic or composite molecules into the mesophase structure of the formed material. In contrast to prior methods that formed hybrid inorganic/organic mesoporous silica, wherein the silica was in the form of powder, the present invention is a method for forming a liquid material that can be used to form highly porous thin films by such standard methods as dip-coating, spray-coating, or spin-coating.

According to the present invention, in the liquid phase, a precursor sol, a solvent, and water are mixed with a hydrophobic polymer, soluble in the solvent, and with a surfactant, wherein importantly the initial surfactant concentration, $c_o$, is less than the critical micelle concentration, cmc. Because the surfactant concentration is less than the critical micelle concentration, subsequent solvent evaporation induces micellization, incorporation of hydrophobic polymers into the hydrophobic micellar interiors, and further assembly into hybrid materials. Evaporation of the solvent promotes stabilization of the polymer in microemulsions along with additional self-assembly of silica surfactant mesophases so that a thin film can be formed on a substrate. The hydrophobic polymer aids in the self-assembly process, serving as a swelling agent to form a high-porosity structure. Subsequent calcination of the thin film can result in a hierarchical mesostructure composed of pores templated by both microemulsions and surfactant liquid crystalline assemblies with the thin films having a porosity of greater than approximately 50%. Highly porous thin films are attractive in applications requiring low dielectric constant materials, low refractive index, and low thermal conductivity.

Precursors such as alkoxysilanes or metal alkoxides, including titanium butoxide, titanium iso-propoxide, zirconium n-butoxide, aluminum iso-propoxide, aluminum iso-propoxide, and mixtures thereof, and organoalkoxysilanes when dissolved in a polar solvent and hydrolyzed under basic, acidic, or neutral conditions are useful for a sol material used in the present invention.

In one embodiment, a homogeneous solution of a hydrophobic soluble polymer, a silica sol using an alkoxysilane ($Si(OR)_4$ in a solvent and a surfactant is prepared, wherein importantly the initial surfactant concentration, c, is less than the critical micelle concentration, cmc. Typical hydrophobic polymers include polypropylene oxide and polypropylene glycol dimethylacrylate. Typical alkoxysilanes include tetramethylorthosilicate, tetraethylorthosilicate, titanium butoxide, titanium iso-propoxide, zirconium n-butoxide, aluminum iso-propoxide, aluminum iso-propoxide and mixtures thereof. Organoalkoxysilanes include methyltrimethoxysilane, methyltriethoxysilane, and other $R'Si(OR)_3$ compounds where R' is an alkyl group, those with fluorinated groups, such as tridecafluoro-1,1,2,2,-tetrahydrooctyltriethoxysilane (TFTS), and compounds with mercapto-terminated groups, such as mercaptopropyl-trimethoxylsilane.

The surfactant can be anionic, cationic, nonionic, or a block copolymer. Anionic surfactants that can be used include, but are not limited to, sulfates, sulfonates, phosphates, and carboxylic acids. Cationic surfactants that can be used include, but are not limited to, alkylammonium salts, gemini surfactants, cetylethylpiperidinium salts, and dialkyldimethylammonium. Nonionic surfactants that can be used, with the hydrophilic group not charged, include, but are not limited to, primary amines, poly(oxyethylene) oxides, octaethylene glycol monodecyl ether and octaethylene glycol monohexadecyl ether. The solvent used is generally a polar organic/water solvent and can be any general polar organic solvent soluble in water, such as an alcohol/water solvent, a formamide/water solvent or a tetrahydrofuran/water solvent.

Because the surfactant concentration is less than the cmc, subsequent solvent evaporation induces micellization, incorporation of hydrophobic polymers into the hydrophobic micellar interiors and further assembly into hybrid silica-surfactant materials. When the solvent evaporation is accomplished by spin-coating, spray-coating or dip-coating and the films are calcined to remove the surfactant and polymer while preserving organo-silicon bonds, a porous thin film is formed on a substrate with a narrow size distribution of pores templated by the microemulsions and surfactants. This can be accomplished by using a low-temperature heat treatment or washing procedure.

Because solvent extraction techniques can collapse the mesoporous network, surfactant molecules are removed by a low temperature pyrolysis procedure wherein the films are heated in an inert atmosphere to a temperature sufficient to decompose the surfactant molecules (e.g., 250° C.) without degrading any covalently-bound organic ligands. This heat treatment also promotes further condensation of the silica framework, helping to stabilize the mesoporous network.

In one preparation to form thin films, a silica sol was prepared from tetraethylorthosilicate (TEOS), a polar organic solvent, water and an acid, a hydrophobic compound such as polypropylene oxide (molecular weight of approximately 2000) and a surfactant, such as a polyoxyethylene ether or a block polymer of the general formula, $HO(CH_2CH_2O)_n(CH_2CHCH_3O)_m(CH_2CH_2O)_nH$, referred to hereafter as p123. The subscripts m and n are integers. In one embodiment, n is 20 and m is 70. The polar organic solvent can be any solvent that solubilizes the other reactants, particularly such solvents as alcohols, and more particularly, methanol, ethanol, propanol, butanol, tetrahydrofuran, and formamide or mixtures thereof.

In one embodiment, an initial silica sol (A2**) was prepared by refluxing tetraethylorthosilicate (TEOS), ethanol, water and an acid, such as HCl, at approximately 60° C. The molar ratio of the TEOS, ethanol and acid was $1:3.8:1.5\times10^{-5}$. The sol was cooled to room temperature and surfactant, $CH_3(CH_2)_{15}(OCH_2CH_2)_{10}OH$, in amounts ranging from 0.6 g to 1.0 g, and the polymer, polypropylene oxide (PPO), in amounts ranging from approximately 0 g to 1.2 g, were added to 5 mL of the sol, along with 0.8 mL of 1N HCl. The sols were filtered and a thin film was prepared from this solution by spin-coating onto a substrate. During the coating procedure, evaporation of the solvent causes the formation of surfactant-stabilized polypropylene microemulsions incorporated into a surfactant-templated silica material. The as-coated films were heated to approximately 400 to 450° C. for approximately 3 hours to remove surfactant and polypropylene oxide templates.

Table I shows a summary of the resulting film properties, including capacitance, dielectric constant, refractive index, and film thickness, obtained by varying amounts of the surfactant and hydrophobic polymer.

X-ray diffraction analysis indicated that the films, for which phase separation did not occur, were ordered. For example with 1 g of surfactant and 1 g of polymer, the resulting film had a 5.4 nm d-spacing before calcination and a 3.7 nm d-spacing after calcination. The refractive index was measured to be approximately 1.1 and the film thickness was approximately 1.4 micrometers. The porosity was approximately 80%.

TABLE I

| | Amount of Surfactant | Amount of PPO | | | | | |
|---|---|---|---|---|---|---|---|
| | | 1.2 g | 1.0 g | 0.8 g | 0.6 g | 0.4 g | 0 g |
| Capacitance (pF) | 1 g | 14 | 18 | 21 | 26 | 34 | 60 |
| Dielectric constant | 1 g | 1.4 | 1.5 | 1.6 | 2.0 | 2.4 | NA |
| Refractive index | 1 g | 1.1 | 1.1 | NA | 1.2 | 1.2 | NA |
| Film thickness (µm) | 1 g | 2.0 | 1.4 | 1.2 | 1.2 | 1.1 | NA |
| Capacitance (pF) | 0.8 g | PS | 15 | 19 | 22 | 30 | 52 |
| Dielectric constant | 0.8 g | PS | 1.5 | 1.3 | 1.5 | 2.0 | NA |
| Refractive index | 0.8 g | PS | NA | NA | 1.1 | 1.2 | NA |
| Film thickness (µm) | 0.8 g | PS | 1.8 | 1.2 | 1.1 | 1.0 | 0.9 |
| Capacitance (pF) | 0.6 g | PS | PS | 17 | 21 | 27 | 51 |
| Dielectric constant | 0.6 g | PS | PS | 1.5 | 1.7 | 1.8 | 3.2 |
| Refractive index | 0.6 g | PS | PS | 1.1 | 1.2 | 1.2 | 1.3 |
| Film thickness (µm) | 0.6 g | PS | PS | 1.6 | 1.3 | 1.0 | 0.8 |

NA—not available.
PS—phase separation occurred.

In another embodiment, the silica sol A2** was prepared as previously described with surfactant p123 in amounts ranging from 0.6 g to 1.2 g, and PPO in amounts ranging from 0.8 g to 1.2 g, added to 5 mL of the sol, along with 0.8 mL of 1N HCl. The sols were filtered and a thin film was prepared from this solution by spin-coating onto a substrate. During the coating procedure, evaporation of the solvent causes the formation of surfactant-stabilized polypropylene microemulsions incorporated into a silica-surfactant thin film material. The as-coated films were heated to approximately 400 to 450° C. to remove surfactant and polypropylene oxide templates. Table II shows a summary of the resulting properties, including capacitance, dielectric constant, refractive index, and film thickness, of the thin films using varying amounts of the surfactant and hydrophobic polymer.

TABLE II

|  |  | Amount of PPO | | |
| --- | --- | --- | --- | --- |
|  | Surfactant | 1.2 g | 1.0 g | 0.8 g |
| Capacitance (pF) | 1.2 g | 20 | 17 | 21 |
| Dielectric constant | 1.2 g | 1.3 | 1.3 | 2.2 |
| Refractive index | 1.2 g | 1.2 | 1.1 | 1.1 |
| Film thickness ($\mu$m) | 1.2 g | 0.9 | 1.0 | 1.3 |
| Capacitance (pF) | 1 g | 17 | 18 | 23 |
| Dielectric constant | 1 g | 1.2 | 1.1 | 2.1 |
| Refractive index | 1 g | 1.2 | 1.1 | 1.1 |
| Film thickness ($\mu$m) | 1 g | 20.8 | 1.2 | 1.2 |
| Capacitance (pF) | 0.8 g | PS | PS | PS |
| Dielectric constant | 0.8 g | PS | PS | 1.7 |
| Refractive index | 0.8 g | PS | PS | 1.2 |
| Film thickness ($\mu$m) | 0.8 g | PS | PS | 1.1 |
| Capacitance (pF) | 0.6 g | PS | PS | PS |
| Dielectric constant | 0.6 g | PS | PS | PS |
| Refractive index | 0.6 g | PS | PS | PS |
| Film thickness ($\mu$m) | 0.6 g | PS | PS | PS |

PS—phase separation occurred.

The results shown in Tables I and II suggest that an increase in the concentration of the polymer PPO generally leads to a lower refractive index and lower dielectric constant as well as a higher porosity. When the surfactant concentration is too low relative to the concentration of the polymer, phase separation can occur.

In another embodiment, a silica sol was prepared from tetraethylorthosilicate (TEOS), a polar organic solvent, water and an acid, and a surfactant, such as a polyoxyethylene ether. A hydrophobic polymer, polypropylene glycol dimethylacrylate can be added and a thin film can be prepared by coating onto a substrate during which time evaporation of the solvent occurred. The thin film is heated to remove surfactant and polymer.

In another embodiment, added to the mixture of the sol, the soluble hydrophobic polymer and the surfactant, is an inorganic or organic compound, which is hereafter referred to as an interstitial compound, that is organized during the micellization into the mesophase structure by either covalent bonding in the porous structure or physically entrapment within the porous structure. Interestingly, these interstitial molecules can be larger than the pore sizes of the mesoporous structure, with the formed porous mesophase conforming around these molecules to form an essentially defect-free mesophase structure while still a retaining narrow pore size distribution and relatively high porosity and surface area. The interstitial compounds include, but are not limited to, organoalkoxysilanes, proteins, dyes, and metal-containing compounds. Any organoalkoxysilane compound can be used but certain compounds are useful for their specific functionality. For example, organoalkoxysilanes with fluorinated groups, such as tridecafluoro-1,1,2,2,-tetrahydrooctyltriethoxysilane (TFTS), make the film hydrophobic and compounds with mercapto-terminated groups, such as mercaptopropyltrimethoxylsilane, can absorb heavy metals. The organoalkoxysilane molecules are covalently bonded to the pores in the present invention to achieve desired functionality. Other interstitial compounds include mercaptopropyltrimethoxylsilane, rhodamine B, cytochrome c, 3-(2,4-dinitrophenylamino)propyl(triethoxy) silane. The presence of these inorganic and organic compounds in the hybrid porous mesophase structure of the present invention allow these materials to be used in sensor applications, as low dielectric constant films, as photonic materials and as optical hosts.

The invention being thus described, it will be apparent that the same may be varied in many ways. Such variations are not to be regarded as a departure from the spirit and scope of the invention, and all such modifications as would be obvious to one skilled in the art are intended to be included within the scope of the following claims.

We claim:

1. An evaporation-induced self-assembly method to prepare a high-porosity, surfactant-templated thin film, comprising:

mixing a precursor sol, a solvent, water, a surfactant, and a hydrophobic polymer, wherein said hydrophobic polymer is soluble in said sol, and wherein said surfactant is at a concentration less than the critical micelle concentration, to form a homogeneous mixture;

coating a substrate with said homogeneous mixture to form a thin film, said coating inducing evaporation of a portion of the solvent to produce a surfactant-stabilized microemulsion dispersed within a hybrid surfactant-silica matrix; and heating said thin film to form a high-porosity, surfactant- and microemulsion-templated thin film with a porosity greater than approximately 50 percent.

2. The method of claim 1 wherein the surfactant is selected from the group consisting of sulfates, sulfonates, phosphates, carboxylic acids, alkylammonium salts, gemini surfactants, cetylethylpiperidinium salts, dialkyldimethylammonium, primary amines, poly (oxyethylene) oxides, octaethylene glycol monodecyl ether, octaethylene glycol monohexadecyl ether and block copolymers.

3. The method of claim 1 wherein the surfactant is selected from the group consisting of $HO(CH_2CH_2O)_{20}(CH_2CHCH_3O)_{70}(CH_2CH_2O)_{20}$,H and $CH_3(CH_2)_{15}(OCH_2CH_2)_{10}OH$.

4. The method of claim 1 wherein the hydrophobic polymer is selected from the group consisting of polypropylene oxide and polypropylene glycol methylacrylate.

5. The method of claim 1 wherein the precursor sol is selected from the group consisting of tetraethylorthosilicate, tetramethylorthosilicate, titanium butoxide titanium isopropoxide zirconium n-butoxide, and aluminum isopropoxide.

6. The method of claim 5 wherein the solvent is selected from the group consisting of an alcohol, formamide, and tetrahydrofuran.

7. The method of claim 1 wherein coating a substrate is selected from the group consisting of spin-coating, spray-coating, or dip-coating.

8. The method of claim 7 wherein said substrate is a crystal silicon wafer or a piezoelectric crystalline quartz substrate.

9. The method of claim 1 wherein the thin film has a dielectric constant less than approximately 2.

10. The method of claim 1 wherein the thin film has a dielectric constant less than approximately 1.5.

11. The method of claim 1 wherein the porosity is greater than approximately 80 percent.

12. The method of claim 1 wherein an interstitial compound is added to said silica sol, said surfactant, and said hydrophobic polymer, wherein said interstitial compound is selected from the group consisting of organoalkoxysilanes, proteins, dyes, and metal-containing compounds.

13. The method of claim 11 wherein the interstitial compound is selected from the group consisting of tridecafluoro-1,1,2,2,-tetrahydrooctyltriethoxysilane, mercaptopropyltrimethoxylsilane, rhodamine B, cytochrome c, and 3-(2,4-dinitrophenylamino)propyl(triethoxy)silane.

14. The product of the method of claim 1.

15. The product of the method of claim 3, used as a material selected from the group consisting of a low dielectric film, membrane and sensor material.

* * * * *